(12) United States Patent
Ono et al.

(10) Patent No.: US 10,235,238 B2
(45) Date of Patent: Mar. 19, 2019

(54) PROTECTING CLUSTERED VIRTUAL ENVIRONMENTS FROM SILENT DATA CORRUPTION

(71) Applicant: Lenovo Enterprise Solutions (Singapore) Pte. Ltd., Singapore (SG)

(72) Inventors: Makoto Ono, Chapel Hill, NC (US); Randolph Scott Kolvick, Durham, NC (US); Joseph J. Jakubowski, Pittsboro, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 48 days.

(21) Appl. No.: 15/164,802

(22) Filed: May 25, 2016

(65) Prior Publication Data
US 2017/0344412 A1 Nov. 30, 2017

(51) Int. Cl.
*G06F 11/00* (2006.01)
*G06F 11/10* (2006.01)

(52) U.S. Cl.
CPC ................ *G06F 11/1004* (2013.01)

(58) Field of Classification Search
None
See application file for complete search history.

(56) References Cited

U.S. PATENT DOCUMENTS

| 7,774,320 | B1* | 8/2010 | Day | G06F 11/0727 |
| | | | | 707/690 |
| 8,320,742 | B2* | 11/2012 | Park | G06F 21/10 |
| | | | | 235/380 |
| 9,067,694 | B2* | 6/2015 | Liu | G05D 1/0883 |
| 2009/0010169 | A1* | 1/2009 | Tamura | H04L 43/0882 |
| | | | | 370/241 |
| 2015/0074404 | A1* | 3/2015 | Kasper | H04L 63/08 |
| | | | | 713/170 |

OTHER PUBLICATIONS

Tomayko, J. E., "Computers in spaceflight: The NASA experience," NASA Contractor Report 182505, Mar. 1988, Chapter 4, pp. 93-107 (19 pages).

(Continued)

*Primary Examiner* — Daniel F. McMahon
(74) *Attorney, Agent, or Firm* — Zilka-Kotab, P.C.

(57) ABSTRACT

In one embodiment, a computer program product includes a computer readable medium having stored thereon computer readable program instructions. The instructions are configured to cause modules of a computer system to: determine whether data are in condition to be propagated beyond the processor to a network environment; and in response to determining the data are in condition to be propagated beyond the processor: perform a data integrity check on the data; receive a result of a second data integrity check from a secondary computer system; compare the result of the data integrity check to the result of the second data integrity check; and, based at least in part on determining the result of the data integrity check matches the result of the second data integrity check, propagate the data beyond the processor. Corresponding systems and methods are also disclosed.

20 Claims, 4 Drawing Sheets

(56) References Cited

OTHER PUBLICATIONS

Cully et al. "Remus: High Availability via Asynchronous Virtual Machine Replication," 5th USENIX Symposium on Networked Systems Design USENIX Association and Implementation, 2008, pp. 161-174.
NEC Corporation of America, "Continuous Availibility and Scalability for Virtualization," Fault Tolerant Virtualization for Microsoft Windows Server Hyper-V, 2010, pp. 1-2.
Dyckowski, J., "Fault Tolerance in Virtualized Data Centers," Disaster Recovery Journal, Jun. 30, 2015, pp. 1-5, retrieved from http://www.drj.com/article/ionline-exclusive/fault-tolerance-in-virtualized-data-centers.html.
Naseer, R. et al., "Analysis of Soft Error Mitigation Techniques for Register Files in IBM Cu-08 90nm Technology," IEEE, 2006, pp. 1-5.
Montesinos, P. et al., "Shield: Cost-Effective Soft-Error Protection for Register Files," Third IBM TJ Watson Conference on Interaction between Architecture, Circuits and Compilers (PAC206), 2006, pp. 1-10.
VMWare, "VMware vSphere™ 4 Fault Tolerance: Architecture and Performance," White Paper, 2009, pp. 1-19.
Petersen, M. et al. "How to Prevent Silent Data Corruption," Preventing Silent Data Corruption in Oracle Linux, Feb. 2013, pp. 1-3, retrieved from www.oracle.com/technetwork/articles/servers-storage-dev/silent-data-corruption-1911480.html.
American Megatrends Inc., "Fault Tolerance in Virtualized Data Centers," Product Specifications Subject to Change without Notice, pp. 1-10, retrieved on Feb. 23, 2016 from https://stortrends.com/?StorTrends_Whitepaper_VMware_Fault_Tolerance.pdf.
Lim, et al. "Understanding and Designing New Server Architectures for Emerging Warehouse-Computing Environments," International Symposium on Computer Architecture, IEEE, 2008, pp. 315-326.

* cited by examiner

PROTECTING CLUSTERED VIRTUAL ENVIRONMENTS FROM SILENT DATA CORRUPTION

FIELD OF THE INVENTION

The present invention relates to preserving data integrity, and more particularly, this invention relates to protecting virtual machines in a clustered environment from silent data corruption.

BACKGROUND

Conventionally, upon detecting an error relating to existence of uncorrectable data within a clustered virtual environment, e.g. data pending submission to an I/O component or operation as part of a write request, a data transmission, etc. the process and/or virtual machine, server, network component, etc. from which the uncorrectable data originates is subjected to a stop operation to prevent propagation of the uncorrectable data outside the source.

In order to maximize system availability and maintain service via the clustered virtual environment, some existing techniques will deploy a secondary, redundant component (e.g. secondary server, etc.) mirroring processes being performed by the primary component. In the event of detecting an error in a pending process on the primary component, the mirrored process on the secondary component may be utilized instead of the primary component, thus maintaining overall system performance despite the uncorrectable error.

The foregoing techniques are effective to address detectable errors. However, other errors are also known to arise in such a manner that the error is undetectable, and these errors may propagate (often to great depth) throughout environments to which the source is in communication. This is known as silent data corruption, and may be caused by a number of problems such as loose cabling, unreliable power supplies, external vibrations, cosmic radiation (and other sources of soft memory errors), and errors introduced by the network environment, etc. Most commonly, silent data corruption (also known as "soft errors") occurs as a result of an alpha particle or cosmic ray interacting with a bit, causing the bit to flip orientation in a manner undetectable by the system.

Silent data corruption may result in cascading failures, in which the system may run for a period of time with undetected initial error causing increasingly more problems until it is ultimately detected. For example, a failure affecting file system metadata can result in files being partially damaged or made completely inaccessible as the file system is used in its corrupted state.

Accordingly, it would be beneficial to provide systems, methods, computer program products and the like which prevent propagation of errors caused by silent data corruption within a clustered virtual environment.

SUMMARY

In one embodiment, a computer program product includes a computer readable medium having stored thereon computer readable program instructions. The instructions are configured to cause a processor of a computer system to: determine whether data are in condition to be propagated beyond the processor to a network environment; and in response to determining the data are in condition to be propagated beyond the processor: perform a data integrity check on the data; receive a result of a second data integrity check from a secondary computer system; compare the result of the data integrity check to the result of the second data integrity check; and, based at least in part on determining the result of the data integrity check matches the result of the second data integrity check, propagate the data beyond the processor.

In another embodiment, a method includes: determining, using a processor, whether data are in condition to be propagated beyond the processor to a network environment; and in response to determining the data are in condition to be propagated beyond the processor: performing, by the processor, a data integrity check on the data; receiving, at the processor, a result of a second data integrity check from a secondary computer system; comparing, by the processor, the result of the data integrity check to the result of the second data integrity check; and, based at least in part on determining the result of the data integrity check matches the result of the second data integrity check, propagating the data beyond the processor.

In yet another embodiment, a system includes a processor and logic configured to cause the processor to: determine whether data are in condition to be propagated beyond the processor to a network environment; and in response to determining the data are in condition to be propagated beyond the processor: perform a data integrity check on the data; receive a result of a second data integrity check from a secondary computer system; compare the result of the data integrity check to the result of the second data integrity check; and, based at least in part on determining the result of the data integrity check matches the result of the second data integrity check, propagate the data to the network environment.

In still yet another embodiment, a system includes: a processing module configured to cause a processor of the system to: determine whether data are in condition to be propagated beyond the processor to a network environment; and in response to determining the data are in condition to be propagated beyond the processor, perform a data integrity check on the data. The system also includes a receiving module configured to receive a result of a second data integrity check from a secondary computer system; a comparator module configured to compare the result of the data integrity check to the result of the second data integrity check; and a transmission module configured to propagate the data to the network environment based at least in part on determining the result of the data integrity check performed by the comparator module matches the result of the second data integrity check.

Other aspects and advantages of the present invention will become apparent from the following detailed description, which, when taken in conjunction with the drawings, illustrate by way of example the principles of the invention.

DETAILED DESCRIPTION

Figure 1:
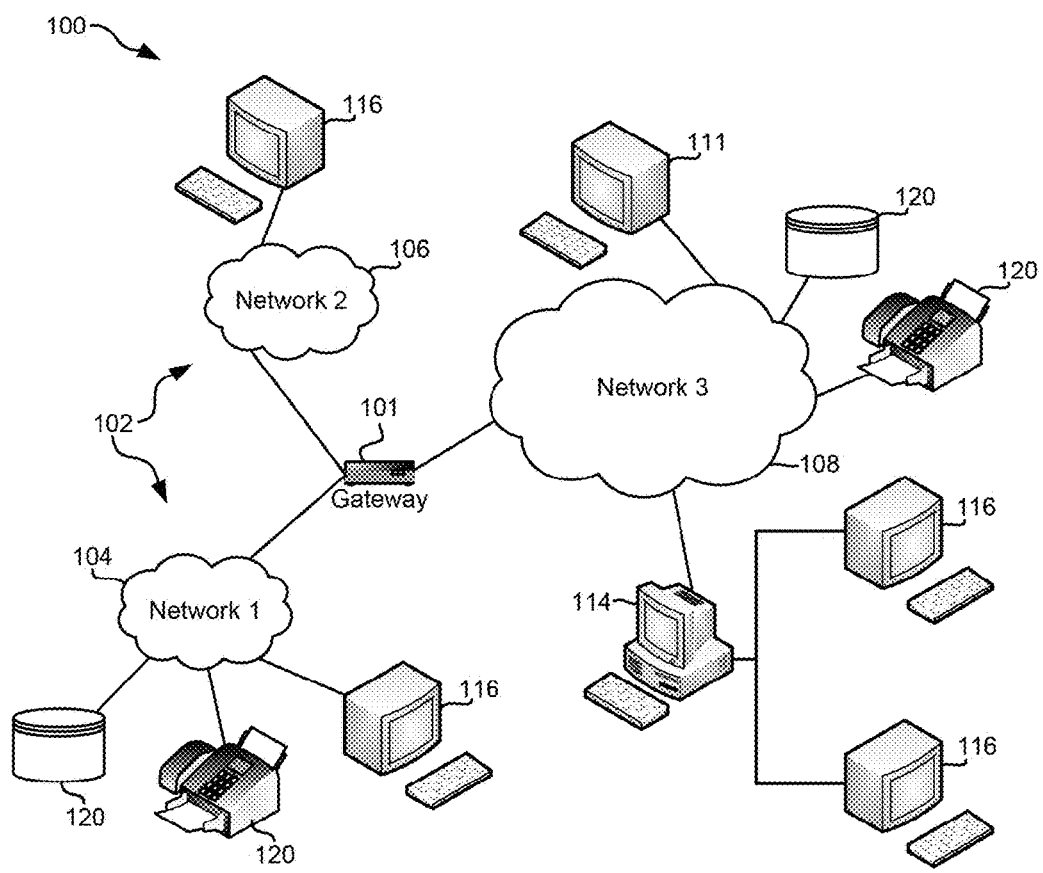
FIG. 1 is a schematic drawing of a computer network environment, according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a computer program product includes a computer readable medium having stored thereon computer readable program instructions. The instructions are configured to cause a processor of a computer system to: determine whether data are in condition to be propagated beyond the processor to a network environment; and in response to determining the data are in condition to be propagated beyond the processor: perform a data integrity check on the data; receive a result of a second data integrity check from a secondary computer system; compare the result of the data integrity check to the result of the second data integrity check; and, based at least in part on determining the result of the data integrity check matches the result of the second data integrity check, propagate the data beyond the processor.

In another general embodiment, a method includes: determining, using a processor, whether data are in condition to be propagated beyond the processor to a network environment; and in response to determining the data are in condition to be propagated beyond the processor: performing, by the processor, a data integrity check on the data; receiving, at the processor, a result of a second data integrity check from a secondary computer system; comparing, by the processor, the result of the data integrity check to the result of the second data integrity check; and, based at least in part on determining the result of the data integrity check matches the result of the second data integrity check, propagating the data beyond the processor.

In yet another general embodiment, a system includes a processor and logic configured to cause the processor to: determine whether data are in condition to be propagated beyond the processor to a network environment; and in response to determining the data are in condition to be propagated beyond the processor: perform a data integrity check on the data; receive a result of a second data integrity check from a secondary computer system; compare the result of the data integrity check to the result of the second data integrity check; and, based at least in part on determining the result of the data integrity check matches the result of the second data integrity check, propagate the data to the network environment.

In still yet another general embodiment, a system includes: a processing module configured to cause a processor of the system to: determine whether data are in condition to be propagated beyond the processor to a network environment; and in response to determining the data are in condition to be propagated beyond the processor, perform a data integrity check on the data. The system also includes a receiving module configured to receive a result of a second data integrity check from a secondary computer system; a comparator module configured to compare the result of the data integrity check to the result of the second data integrity check; and a transmission module configured to propagate the data to the network environment based at least in part on determining the result of the data integrity check performed by the comparator module matches the result of the second data integrity check.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
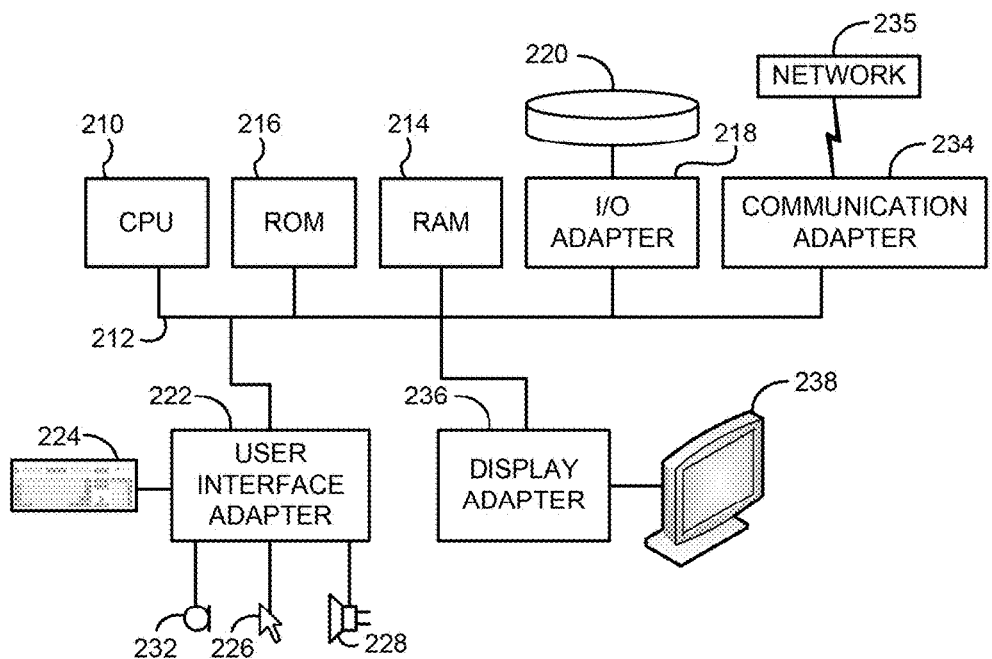
FIG. 2 depicts a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
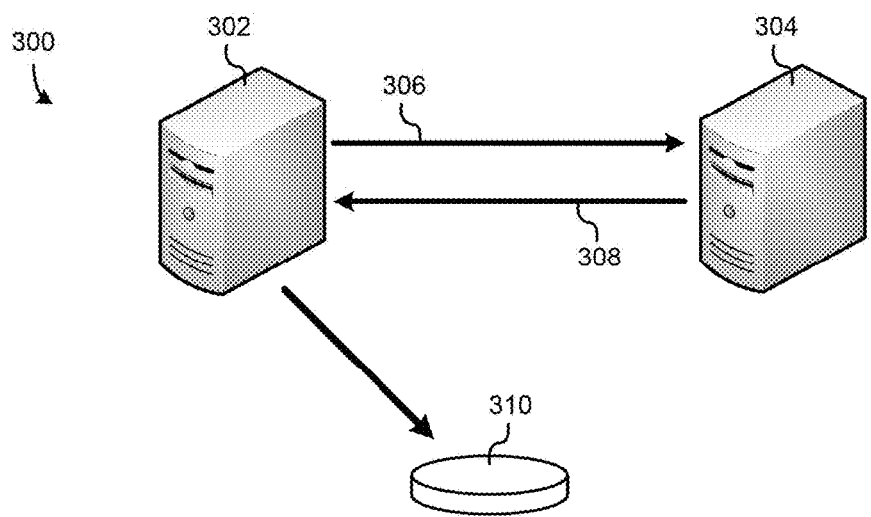
FIG. 3 depicts an exemplary redundant computer system, according to one embodiment.

In one embodiment, and as shown in FIG. 3, the presently disclosed inventive concepts may be implemented the context of a redundant computer system 300, which may be part of a compute cluster, a storage area network (SAN), a LAN, a WAN, or any other suitable environment including a plurality of components (e.g. preferably hardware components and/or virtualized components in various embodiments) communicatively coupled to one another via the network environment. The network environment preferably includes a plurality of components such as servers, routers, switches, data storage devices, compute nodes (preferably including a memory and a processor or processors), workstations, bridges, etc. as would be understood by a person having ordinary skill in the art upon reading the present descriptions.

In one approach, the architecture 100 shown in FIG. 1 may be considered an illustrative embodiment of a network environment in which redundant computer system 300 may be utilized, and/or the representative hardware environment shown in FIG. 2 may be considered an exemplary embodiment of component of the network environment.

In various embodiments, one or more component(s) may be paired with corresponding shadow component(s) may include functionally equivalent or identical virtual machines, virtual switches, etc. As shown in FIG. 3, computer system 302 is paired with secondary computer system 304 for purposes of detecting silent data corruption. In preferred approaches, computer systems 302, 304 respectively comprise a primary and secondary server, more preferably a primary and secondary virtual machine configured to perform workloads within the network environment. Redundancy of workload processing may be accomplished utilizing techniques such as a lockstep approach, as would be understood by a person having ordinary skill in the art upon reading the present disclosures.

More particularly, and as will be described in further detail below regarding FIG. 4 and method 400, silent data corruption may be detected, and propagation thereof prevented, by deploying a cross-validation of data between computer systems 302, 304 at the processor level. In general, upon accomplishing a processing task, and/or upon accomplishing a series of processing tasks applied to data by a processor of the computer system 302, data are withheld from propagating to the network environment to which the computer system 302 is communicatively coupled. For instance, the data may be transferred to a buffer while a data integrity check is performed, and results thereof compared to a result of a second data integrity check performed by a secondary computer system 304. If the comparison reveals consistency between the data integrity check and the second data integrity check results, then the processed data may be propagated to/throughout the network environment, e.g. via an I/O forwarding operation.

In preferred embodiments, the process of checking data integrity involves evaluating a register from the processor, the register corresponding to a processing operation performed on data for which the integrity needs to be checked. This advantageously provides contextual awareness of the integrity of data coming from the processor and pending propagation to/throughout the network environment.

As referenced herein, data "propagation" should be understood to include any transfer, travel, transmission, writing, copying, etc. of data to other components of the network environment other than the component performing a particular processing operation on the data, e.g. system 302 in the context of FIG. 3 and the descriptions thereof. Propagation to a network environment may include exposure of the data to the network environment (or vice versa), whereas propagation throughout a network may include the data transitioning through the network environment to one or more components thereof.

For instance, in the context of a write I/O, propagation to the network environment may include dispatching the data, and propagation throughout the network environment may include writing the data to a storage device. Similarly, propagation may include dissemination of a packet or packet(s) to one or more components of the network environment, in various approaches, e.g. one or more workstations, servers, etc. as a packet or packet(s), to a storage device as a write request and/or I/O operation, etc. as would be understood by a person having ordinary skill in the art upon reading the present disclosures.

Prior to data being released for propagation, computer system 302 performs a data integrity check on the data, and submits a request 306 for a result of a corresponding second data integrity check performed by the secondary computer system 304 on corresponding second data, in one embodiment as shown in FIG. 3. The request may optionally include data comprising a result of a data integrity check performed by the computer system 302, which may be sent to the secondary computer system 304 to verify integrity of the corresponding processing result performed thereby, e.g. a mirrored process.

Preferably, the second data comprise data processed in an identical manner as the data on computer system 302, using identical input, and thus represent a one-to-one correspondence with data processed on the computer system 302, assuming no silent data corruption exists. In particularly preferred embodiments, the processing performed by computer systems 302, 304 are checked for integrity by means of a technique such as an error correction code (ECC) technique, a cyclic redundancy check (CRC) technique, a parity check, etc. as would be understood by a person having ordinary skill in the art upon reading the present disclosures.

In response to receiving request 306, secondary computer system 304 performs the second data integrity check, and sends a result 308 thereof back to computer system 302. In response to receiving result 308, the computer system 302 compares the result of the data integrity check performed on the data resident on computer system 302 against the result 308 achieved via the second data integrity check by secondary computer system 304. If the comparison yields a match between the two results, then the data are clear from silent corruption, and are permitted to propagate to/throughout the network environment, e.g. as a write I/O applied to storage device 310, an I/O forwarding packet distributed to one or more components of the network environment, etc. as would be understood by a person having ordinary skill in the art upon reading the present disclosures.

On the other hand, if a mismatch is detected, then the data are preferably not allowed to propagate, and the processes on both computer system 302 and computer system 304 are aborted, since either or both of the data processed on computer system 302 and/or the second data processed on secondary computer system 304 are likely to be subject to silent corruption. However, it is not possible to definitively determine which of the data and second data are corrupted, so for caution both are discarded without propagating to/throughout the network environment.

Accordingly, in preferred approaches data are not allowed to propagate to/throughout the network environment until integrity thereof is determined based on a cross-check between the result of the data integrity checks performed by computer system 302 and secondary computer system 304.

In some approaches, it may be advantageous to repeat the processing of data and second data on computer system 302 and secondary computer system 304, and subsequently repeat the foregoing process to validate whether silent data corruption remains present. Such approaches may avoid the possibility of false positive designation of silent data corruption.

In various embodiments, the foregoing process may be performed at a granularity depending upon the nature of the network environment, processes being handled thereby, etc. as would be understood by a person having ordinary skill in the art upon reading the present disclosures. For instance, higher granularity may be desirable for secure workflows such as financial processing where data loss or corruption may be unacceptable, or less frequently for applications in which data loss is more tolerable.

An exemplary embodiment with little or no corruption tolerance may therefore perform detection of silent data corruption for each I/O process, request, etc. applicable to the processor. In other embodiments, and to reduce overhead of performing data integrity checks and comparisons of the results thereof, several I/O processes may be performed and corresponding data retained, e.g. in a buffer of the computer system 302, while data integrity checks and comparisons of the corresponding results may be performed on a periodic basis, such as once every 25 milliseconds.

Figure 4:
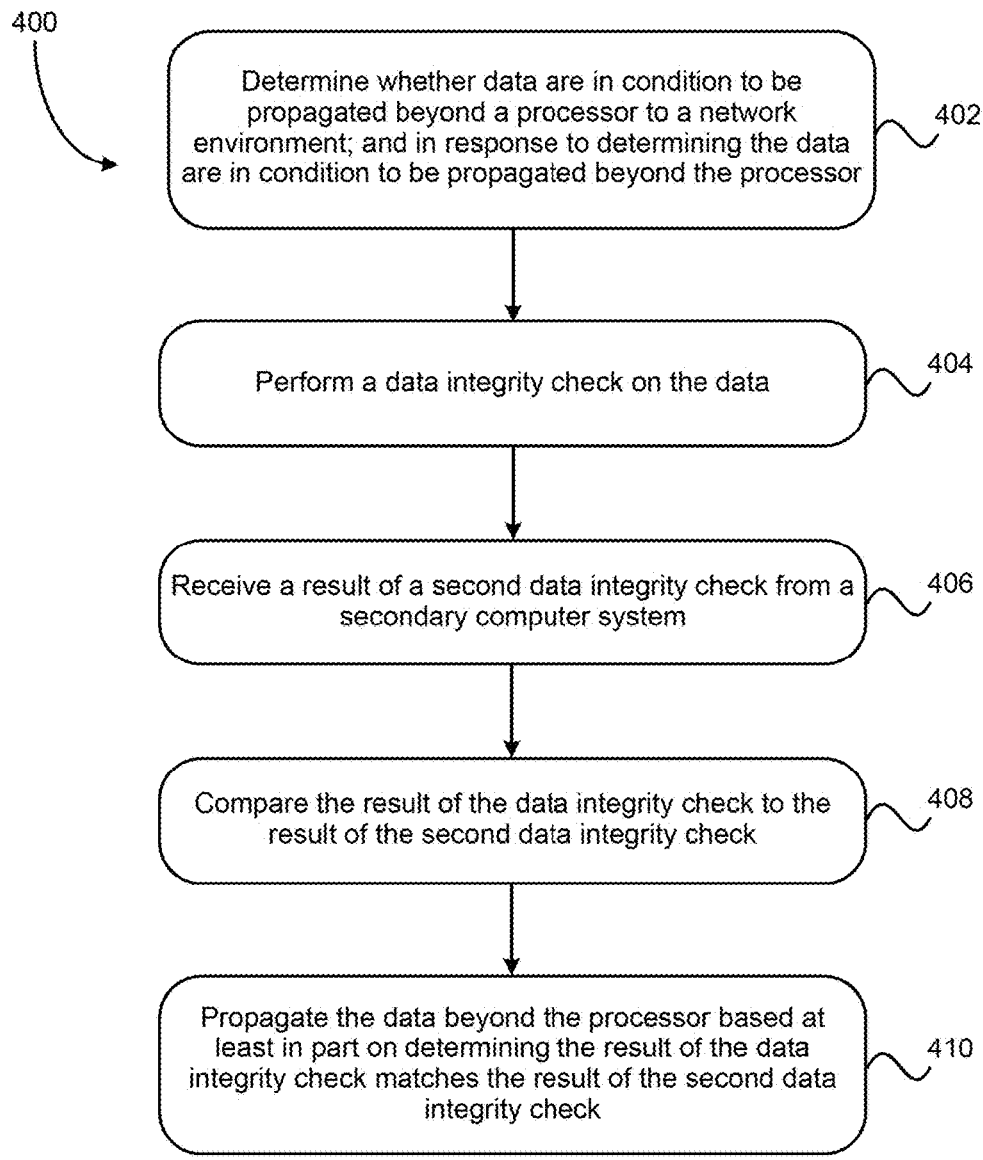
FIG. 4 shows a flowchart of a method, according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a management server of a network environment, or some other device having one or more processors therein such as a cluster. The processor, e.g., processing circuit(s), chip(s), etc. may be utilized in any device to perform one or more steps of the method 400.

However, as noted herein above, it is preferable for at least some operations of the method to be performed using one or more processors to enable detection and prevention of silent data corruption at the processor level, before propagation beyond the processor. Illustrative processors include, but are not limited to, a central processing unit (CPU), an application specific integrated circuit (ASIC), a field programmable gate array (FPGA), etc., combinations thereof, or any other suitable computing device known in the art.

As will be appreciated by persons having ordinary skill in the art upon reading the present disclosures, the presently disclosed inventive concepts are most useful in the context of a single-thread processor being utilized in an enterprise environment. The likelihood of silent data corruption in standalone servers is relatively small, and performing additional stop-on-errors as enforced by various embodiments of the presently disclosed inventive techniques would therefore add overhead to the standalone system without conferring significant benefit via avoiding silent data corruption.

In addition, in order to isolate silently corrupted data from propagation to/throughout a network environment, the presently disclosed inventive techniques exhibit the unique feature of detecting silent data corruption of data prior to data being released from the processor for propagation to or throughout the network environment.

As shown in FIG. 4, method 400 may initiate with operation 402, in which a processor, e.g. of computer system 302, is used to make a determination as to whether data are in condition to be propagated beyond the processor to a network environment.

Data may be considered in condition for propagation based on completion of a processing operation applied thereto, based on passage of a predetermined amount of time (e.g. 25 milliseconds), or any other suitable technique as would be understood by a person having ordinary skill in the art upon reading the present disclosures. In some applications where data loss/corruption tolerance is low or zero, it is critical to avoid silent data corruption by applying the presently disclosed inventive concepts on a per-operation basis, e.g. per I/O request/operation.

In response to determining the data are in condition for propagation to/throughout the network environment, method 400 further includes performing operations 404-410. If data are not in condition for propagation (e.g. processing thereof is still underway, operations 404-410 may be, and preferably are, deferred until conditions are appropriate for propagation.

In operation 404, a data integrity check is performed on the data using the processor. The data integrity check may include a checksum, a hash, an encrypted hash, or any other suitable technique for checking integrity, and preferably include a Cyclic Redundancy Check, in some approaches and as discussed in further detail below.

Operation 406 involves receiving, at the processor, a result (e.g. 308) of a second data integrity check from a secondary computer system (e.g. 304). The result of the second data check preferably is obtained by the secondary computer system in the same manner as the result of the data integrity check performed by the computer system (e.g. 302). In some embodiments, the result may be received in response to a request from computer system to the secondary computer system, and/or may be automatically computed and sent to the computer system from the secondary computer system, e.g. in response to determining processing of second data are complete.

In operation 408, the result of the data integrity check is compared to the result of the second data integrity check, e.g. by the processor of the computer system.

Based at least in part on determining the result of the data integrity check matches the result of the second data integrity check, operation 410 involves propagating the data beyond the processor. As noted below, the propagation may additionally and/or alternatively be based on additional comparisons, e.g. by the secondary computer system, in some embodiments.

Of course, as noted above, method 400 may include one or more additional and/or alternative operations, features, functions, etc. For instance, in various approaches, method 400 may include any combination of the following.

In one instance, the method 400 may include preventing propagation of the data to/throughout the network environment in response to determining the result of the data integrity check does not match the result of the second data integrity check. Preventing propagation may involve performing a stop-on-error based at least in part on determining the result of the data integrity check does not match the result of the second data integrity check, in more embodiments.

In various embodiments, to further validate the integrity of the data, propagating the data to/throughout the network environment is also based on receiving an indication from the secondary computer system 304 that the result of the second data integrity check matches the result of the data integrity check performed by the computer system 302. As such, the secondary computer system 304 may also perform comparisons between the result of the data integrity check performed by the computer system 302 and the result of the second data integrity check performed by the secondary computer system 304.

Accordingly, method 400 may include distributing a result of the data integrity check to a processor of a secondary computer system. In response, the computer system 302 may receive an indication from the secondary computer system 304 that the result of the second data integrity check does not match the result of the data integrity check. Propagation of the data to/throughout the network environment is preferably prevented in response to receiving the indication from secondary computer system 304.

In preferred approaches, each of the data integrity check and the second data integrity check comprise a Cyclic Redundancy Check (CRC), which even more preferably is performed on a processor register of each respective system. The result of the data integrity checks may thus comprise a result of performing CRC on a processor registry of computer system 302 and/or secondary computer system 304, in various embodiments.

The foregoing method 400 may be implemented as a computer program product and/or a system, in various embodiments and as suggested hereinabove. In computer program product implementations, the embodiments may include a computer readable medium having program instructions stored thereon which are readable/executable by a computer to cause the computer to perform the method, e.g. using one or more modules or components as described below regarding system embodiments.

System embodiments, additionally and/or alternatively, may include one or more modules such as a processing module, a receiving module, a comparator module, and/or a transmission module. Various modules may be configured to perform different operations of the method embodiments discussed above regarding FIGS. 3-4, in several embodiments.

Figure 5:
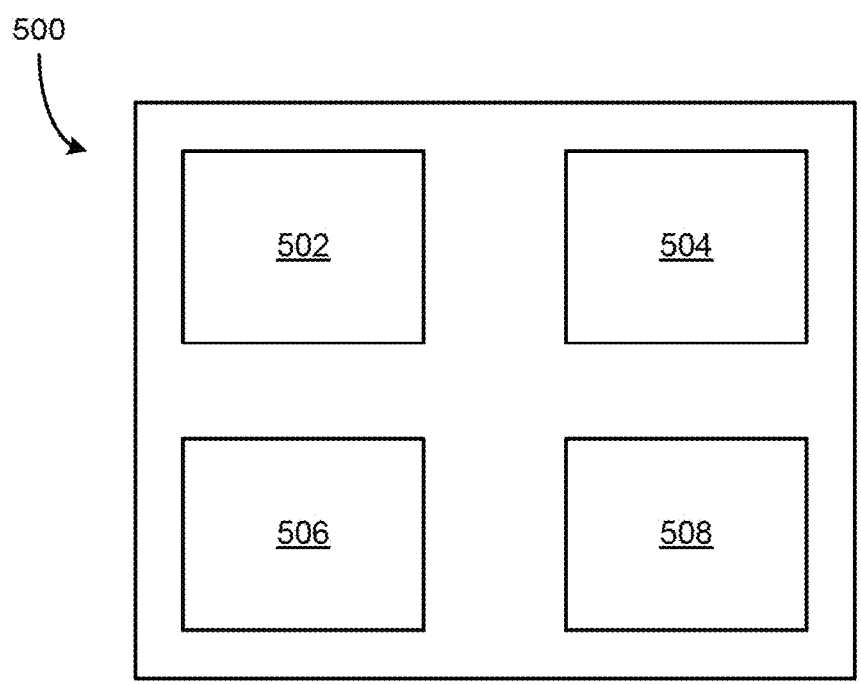
FIG. 5 is a simplified schematic of a system for protecting clustered virtual environments from silent data corruption, according to one embodiment.

For instance, and with reference to FIG. 5, in one approach a system 500 includes: a processing module 502 configured to cause a processor of the system to: determine whether data are in condition to be propagated beyond the processor to a network environment; and in response to determining the data are in condition to be propagated beyond the processor, perform a data integrity check on the data. The system also includes a receiving module 504 configured to receive a result of a second data integrity check from a secondary computer system; a comparator module 506 configured to compare the result of the data integrity check to the result of the second data integrity check; and a transmission module 508 configured to propagate the data to the network environment based at least in part on determining the result of the data integrity check performed by the comparator module matches the result of the second data integrity check.

The system may optionally include logic configured to cause the transmission module 508 to prevent propagation of the data to the network environment in response to determining the result of the data integrity check performed by the comparator module does not match the result of the second data integrity check received from the secondary computer system, in another embodiment.

In more embodiments, the system may include logic configured to cause the receiving module 504 to receive an indication from the secondary computer system that the result of the second data integrity check does not match the result of the data integrity check performed by the comparator module 506; and cause the transmission module 508 to prevent propagation of the data to the network environment in response to receiving the indication.

Further still, propagating the data to the network environment may be additionally and/or alternatively based on the receiving module 504 receiving an indication from the secondary computer system that the result of the second data integrity check matches the result of the data integrity check performed by the comparator module 506.

The system may include logic configured to cause the transmission module 508 to distribute a result of the data integrity check to a processing module of a secondary computer system.

In preferred approaches, each of computer system 302 and secondary computer system 304 shown in FIG. 3 may include modules such as described above with reference to FIG. 5. Even more preferably, each corresponding module of computer system 302 and secondary computer system 304 may be substantially identical with respect to performance, operability, and operations performed.

Of course, other embodiments may include any combination of the foregoing, as well as modules configured to perform any operation as discussed herein in any combination, permutation, etc. without departing from the scope of the instant disclosures.

By implementing the aforementioned techniques, features, and components, in various embodiments, the presently disclosed inventive concepts advantageously improve the function of network environments and associated systems by preventing propagation of silent data corruption to/throughout the environment, and/or to other environments with which the affected environment is in communication. Although the silently corrupted data may not be precisely determined (e.g. whether the primary or secondary component data is the corrupted data) and the corresponding processes are aborted on each component, this preemptive action prevents propagation of the error to/throughout the environment, thus preventing loss/corruption of data on a large scale. Since silent data corruption typically propagates to a high degree throughout environments prior to ultimate detection, the presently disclosed inventive concepts provide an improvement to the computer systems' ability to ensure data integrity throughout a network environment.

In addition, by leveraging the presently disclosed inventive techniques, and in particular by implementing the presently disclosed CRCs at the processor with high resolution (e.g. once per 25 milliseconds, with each I/O request, etc. as disclosed herein), previously undetectable errors may be detected and prevented from propagation to/throughout the network environment.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product, comprising: a non-transitory computer readable medium having stored thereon computer readable program instructions configured to cause a processor of a computer system to:
   determine whether data are in condition to be propagated beyond the processor to a network environment;
   in response to determining the data are in condition to be propagated beyond the processor:
   perform a data integrity check on the data;
   receive a result of a second data integrity check from a secondary computer system;
   compare a result of the data integrity check to the result of the second data integrity check; and
   based at least in part on determining the result of the data integrity check matches the result of the second data integrity check, propagate the data beyond the processor.

2. The computer program product as recited in claim 1, comprising computer readable program instructions configured to cause the processor of the computer system to: prevent propagation of the data to the network environment in response to determining the result of the data integrity check does not match the result of the second data integrity check.

3. The computer program product as recited in claim 1, comprising computer readable program instructions configured to cause the processor of the computer system to:
receive an indication from the secondary computer system that the result of the second data integrity check does not match the result of the data integrity check; and
prevent propagation of the data to the network environment in response to receiving the indication.

4. The computer program product as recited in claim 1, wherein propagating the data to the network environment is further based on receiving an indication from the secondary computer system that the result of the second data integrity check matches the result of the data integrity check.

5. The computer program product as recited in claim 1, comprising computer readable program instructions configured to cause the processor of the computer system to:
distribute a result of the data integrity check to a processor of a secondary computer system; and
wherein determining whether the data are in condition to be propagated beyond the processor comprises determining whether a data processing operation applicable to the data is complete.

6. The computer program product as recited in claim 1, wherein each of the data integrity check and the second data integrity check comprise at least one technique selected from a group consisting of: a parity check; and an encrypted hash.

7. The computer program product as recited in claim 1, comprising computer readable program instructions configured to cause the processor of the computer system to:
perform a stop on error based at least in part on determining the result of the data integrity check does not match the result of the second data integrity check.

8. A method, comprising:
determining, using a processor, whether data are in condition to be propagated beyond the processor to a network environment; and
in response to determining the data are in condition to be propagated beyond the processor:
performing, by the processor, a data integrity check on the data;
receiving, at the processor, a result of a second data integrity check from a secondary computer system;
comparing, by the processor, a result of the data integrity check to the result of the second data integrity check; and
based at least in part on determining the result of the data integrity check matches the result of the second data integrity check, propagating the data beyond the processor.

9. The method as recited in claim 8, comprising preventing propagation of the data to the network environment in response to determining the result of the data integrity check does not match the result of the second data integrity check.

10. The method as recited in claim 8, comprising:
receiving an indication from the secondary computer system that the result of the second data integrity check does not match the result of the data integrity check; and
preventing propagation of the data to the network environment in response to receiving the indication.

11. The method as recited in claim 8, wherein propagating the data to the network environment is further based on receiving an indication from the secondary computer system that the result of the second data integrity check matches the result of the data integrity check.

12. The method as recited in claim 8, wherein determining whether the data are in condition to be propagated beyond the processor comprises determining whether a data processing operation applicable to the data is complete.

13. The method as recited in claim 8, wherein each of the data integrity check and the second data integrity check comprise a technique selected from a group consisting of: a parity check, an encrypted hash, and an Error Code Correction technique.

14. The method as recited in claim 8, comprising performing a stop-on-error based at least in part on determining the result of the data integrity check does not match the result of the second data integrity check.

15. A system, comprising:
a processing module configured to cause a processor of the system to:
determine whether data are in condition to be propagated beyond the processor to a network environment; and
in response to determining the data are in condition to be propagated beyond the processor, perform a data integrity check on the data;
a receiving module configured to receive a result of a second data integrity check from a secondary computer system;
a comparator module configured to compare a result of the data integrity check to the result of the second data integrity check; and
a transmission module configured to propagate the data to the network environment based at least in part on the comparator module determining the result of the data integrity check matches the result of the second data integrity check.

16. The system as recited in claim 15, comprising logic configured to cause the transmission module to prevent propagation of the data to the network environment in response to the comparator module determining the result of the data integrity check does not match the result of the second data integrity check received from the secondary computer system.

17. The system as recited in claim 15, comprising logic configured to:
receive, at the receiving module an indication from the secondary computer system that the result of the second data integrity check does not match the result of the data integrity check; and
cause the transmission module to prevent propagation of the data to the network environment in response to receiving the indication.

18. The system as recited in claim 15, wherein propagating the data to the network environment is further based on the receiving module receiving an indication from the secondary computer system that the result of the second data integrity check matches the result of the data integrity check.

19. The system as recited in claim 15, wherein the processing module is configured to determine whether the data are in condition to be propagated beyond the processor based on determining whether a data processing operation applicable to the data is complete.

20. The system as recited in claim 15, wherein each of the data integrity check and the second data integrity check utilize an Error Correction Code (ECC) technique.

* * * * *